(12) United States Patent
Mercier et al.

(10) Patent No.: US 8,977,970 B2
(45) Date of Patent: Mar. 10, 2015

(54) METHOD AND SYSTEM FOR HANDLING MEDIA IN AN INSTANT MESSAGING ENVIRONMENT

(75) Inventors: Denis Mercier, Boischatel (CA); Simon Ruel, Quebec (CA); Benoit Landry, Quebec (CA); Richard-Philippe Wafer, Stoneham (CA); Philippe Lefebvre, Quebec (CA)

(73) Assignee: BCE Inc., Verdun, Quebec (CA)

( * ) Notice: Subject to any disclaimer, the term of this patent is extended or adjusted under 35 U.S.C. 154(b) by 1058 days.

(21) Appl. No.: 12/297,978

(22) PCT Filed: Dec. 22, 2006

(86) PCT No.: PCT/CA2006/002111
§ 371 (c)(1),
(2), (4) Date: Oct. 21, 2008

(87) PCT Pub. No.: WO2008/077225
PCT Pub. Date: Jul. 3, 2008

(65) Prior Publication Data
US 2009/0113304 A1    Apr. 30, 2009

(51) Int. Cl.
*G06F 3/0481* (2013.01)

(52) U.S. Cl.
USPC .......... 715/758; 715/971; 715/748; 707/913; 707/922

(58) Field of Classification Search
USPC .................. 715/758, 971, 748; 707/913, 922
See application file for complete search history.

(56) References Cited

U.S. PATENT DOCUMENTS

| | | | |
|---|---|---|---|
| 6,865,162 B1 * | 3/2005 | Clemm | 370/286 |
| 7,519,667 B1 * | 4/2009 | Capps | 709/206 |
| 2004/0110489 A1 | 6/2004 | Murri et al. | |
| 2005/0125496 A1 | 6/2005 | Thuerk | |
| 2006/0039350 A1 | 2/2006 | Sturrock et al. | |
| 2009/0193138 A1 * | 7/2009 | Capps | 709/231 |
| 2009/0328112 A1 * | 12/2009 | Weaver | 725/87 |

OTHER PUBLICATIONS

International Search Report mailed on Oct. 15, 2007 in connection with corresponding International Patent Application No. PCT/CA2006/002111.
Written Opinion of the International Searching Authority mailed on Oct. 15, 2007 in connection with corresponding International Patent Application No. PCT/CA2006/002111.

* cited by examiner

*Primary Examiner* — Namitha Pillai (57) ABSTRACT

A method and system for handling media at a communication entity, wherein the media is associated with a communication session that is capable of entering an active state and an inactive state. The method comprises determining when the communication session is in an inactive state, causing the media associated with the communication session to be stored when the communication session has entered an inactive state, and causing the stored media to be conveyed to a user of the communication entity upon determination that the communication session has re-entered an active state.

75 Claims, 7 Drawing Sheets

METHOD AND SYSTEM FOR HANDLING MEDIA IN AN INSTANT MESSAGING ENVIRONMENT

FIELD OF THE INVENTION

The present invention relates generally to the field of instant messaging (IM), and more particularly to a method and system for handling media associated with a given IM communication session.

BACKGROUND OF THE INVENTION

Instant messaging is commonly used for exchanging text messages between two parties that are connected to a network at the same time. In order to perform the instant messaging, a client program at a user's communication entity (such as a personal computer, or a cell phone) connects to an instant messaging service (such as MSN messenger, iTalk, Google-Talk, etc . . . ) over a network. The instant messaging service allows the two communication entities to establish a communication session for sending text back and forth in substantially real time.

Instant messaging is known to be a fast, easy and non-intrusive form of communication between individuals, and is becoming increasingly popular among young people, and even in some corporate environments. There are many advantages to communicating via instant messaging. For example, as opposed to email, instant messaging permits almost immediate feedback, and two-way exchange, with another party. In addition, instant messaging facilitates the quick exchange of information, such as Uniform Resource Locators (URLs) or document snippets, that cannot easily be conveyed via other forms of real-time communication, such as phone conversations. A person involved in an instant messaging text conversation can still perform other operations, such as checking email, browsing the web, or working on a word processing file, at the same time that the person is conducting the instant messaging session.

In addition, in the case of text messaging, a user can conduct multiple instant messaging sessions at the same time. In most cases, the user will have a different chat window open for each one of the text sessions in which the user is involved. When one window is active, the user is able to type and send a message to the contact associated with that window. Meanwhile, the other inactive windows are still able to receive incoming text messages, which the user can easily switch to, in order to carry on multiple concurrent text sessions.

A deficiency with existing instant messaging systems is that it takes time for the user to type in an outgoing message. This can be time consuming for the user who is typing the message, and boring for the person who is waiting to receive the message.

In light of the above, it can be seen that there is a need in the industry for an improved system for enabling communication entities to communicate in an instant messaging environment.

SUMMARY OF THE INVENTION

In accordance with a first broad aspect, the present invention provides a method for handling media at a communication entity, the media being associated with a communication session that is capable of entering an active state and an inactive state. The method comprises determining when the communication session is in an inactive state, causing the media associated with the communication session to be stored upon determination that the communication session has entered an inactive state, and causing the stored media to be conveyed to a user of the communication entity upon determination that the communication session has re-entered an active state.

In accordance with a second broad aspect, the present invention provides a communication entity that comprises an input and a processing unit. The input is operative for receiving from a second communication entity, media associated with a communication session, the communication session being capable of entering an active state and an inactive state. The processing unit is operative for determining when the communication session is in an inactive state, causing media associated with the communication session to be stored upon determination that the communication session has entered an inactive state and causing the stored media to be conveyed to a user of the communication entity upon determination that the communication session has re-entered an active state.

In accordance with a third broad aspect, the present invention provides a communication entity that comprises a first functional unit, a second functional unit and a third functional unit. The first functional unit is operative for receiving media from another communication entity, the media being associated with a given communication session occurring at the communication entity. The second functional unit is operative for monitoring at least one communication session occurring at the communication entity for determining whether the at least one communication session is in an active state or an inactive state, identifying the given communication session in the at least one communication session to which the media from the second communication entity is associated, and when the given communication session is in the inactive state, causing the media associated to the given communication session to be stored. Finally, the third functional unit is operative for causing the stored media to be conveyed to a user of the communication entity upon detection by the second functional unit that the given communication session has entered an active state.

In accordance with a fourth broad aspect, the present invention provides a computer-readable storage medium that comprises a program element for execution by a processing entity for handling media associated with a communication session that is capable of entering an active state and an inactive state. The processing entity when executing the program element, being operative for determining when the communication session is in an inactive state, causing media associated with the communication session to be stored upon determination that the communication session has entered an inactive state, and causing the stored media to be conveyed to a user of a communication entity upon determination that the communication session has re-entered an active state.

In accordance with a fifth broad aspect, the present invention provides a method for conducting a communication session, the communication session being capable of entering an active state and an inactive state. The method comprises being attentive to received media associated with the communication session when the communication session is in an active state, causing the communication session to enter an inactive state, wherein media received for the communication session while it is in an inactive state is stored, and having the stored media be conveyed upon causing the communication session to re-enter an active state.

In accordance with a sixth broad aspect, the present invention provides a server system for handling media at a communication entity, the media being associated with a communication session that is capable of entering an active state and an inactive state. The server system stores a program element for execution by a processing unit. The program element comprises a first program element component for determining when the communication session is in an inactive state, a second program element component for causing media associated with the communication session to be stored upon determination that the communication session has entered an inactive state, and a third program element component for causing the stored media to be conveyed to a user of the communication entity upon determination that the communication session has re-entered an active state.

In accordance with a seventh broad aspect, the present invention provides a system comprising a first communication entity, and a second communication entity. The second communication comprises an input for receiving from the first communication entity media associated with a communication session, the communication session being capable of entering an active state and an inactive state, wherein when the communication session is in the active state a user of said second communication entity is attentive to communication with said first communication entity. The second communication entity further comprises a processing unit for determining when the communication session is in an inactive state, causing the media associated with the communication session to be stored upon determination that the communication session has entered an inactive state and causing the stored media to be conveyed to a user of the second communication entity upon determination that the communication session has re-entered an active state.

These and other aspects and features of the present invention will now become apparent to those of ordinary skill in the art upon review of the following description of specific embodiments of the invention and the accompanying drawings.

Other aspects and features of the present invention will become apparent to those ordinarily skilled in the art upon review of the following description of specific embodiments of the invention in conjunction with the accompanying figures.

DETAILED DESCRIPTION

Figure 1:
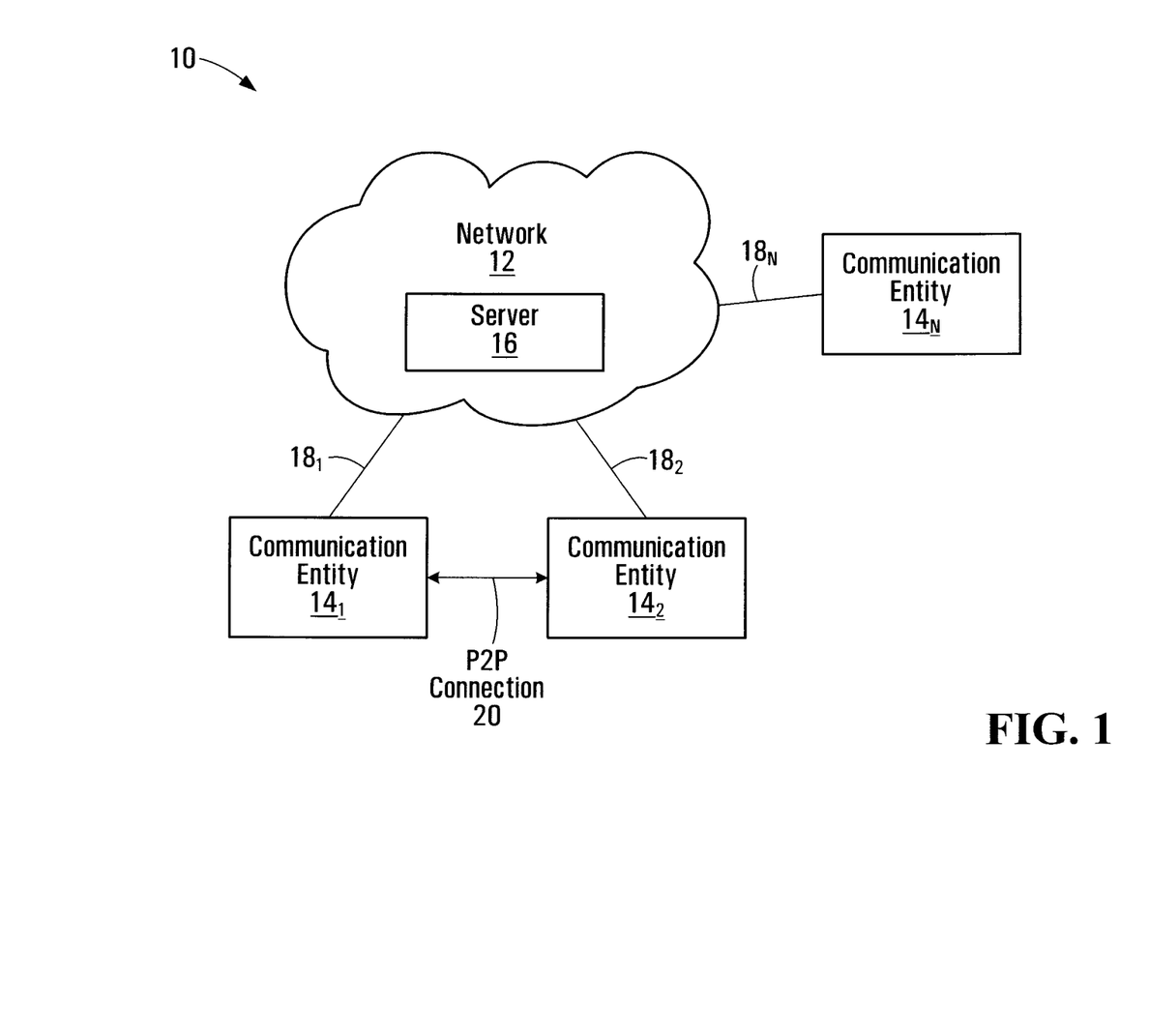
FIG. 1 shows a network architecture, in accordance with a non-limiting example of implementation of the present invention.

Shown in FIG. 1 is a non-limiting example of a network architecture 10 in which a method and system for handling media in accordance with the present invention can be implemented. As shown, the network architecture 10 comprises a network 12, and a plurality of communication entities $14_{1-n}$ connected to one another over the network 12. The network 12 includes a server 16 that is operative to transmit and receive signals with the communication entities $14_{1-n}$. The server 16 can process and issue signals concurrently using suitable methods known in the computer related arts. Although only one server 16 is shown in FIG. 1, it should be appreciated that the network 12 may include multiple servers 16 such that the communication entities $14_{1-n}$ are interconnected via a server system. The network 12 may be any suitable network, including but not limited to a global public network such as the Internet, a private network, such as an Intranet, or a wireless network, such as a cellular network, or a combination thereof.

As shown, the communication entities $14_{1-n}$ are connected to the network 12, via communication links $18_{1-n}$. The communication links $18_{1-n}$ can be metallic conductors, optical fibres or wireless links, without departing from the spirit of the invention. It should be appreciated that communication between communication entities $14_{1-n}$ can occur via the server 16 of network 12, or alternatively can occur over a peer-to-peer (P2P) connection 20, as shown between communication entities $14_1$ and $14_2$. In the peer-to-peer connection, the two communication entities $14_1$ and $14_2$ communicate without a server managing the connection. Instead, the two communication entities $14_1$ and $14_2$ act as equal nodes that simultaneously function as both "clients" and "servers". The manner in which peer-to-peer connections function is known in the art, and as such will not be described in more detail herein. It should be appreciated that link 20 can traverse the network 12, and just not go through the server 16.

Figure 2:
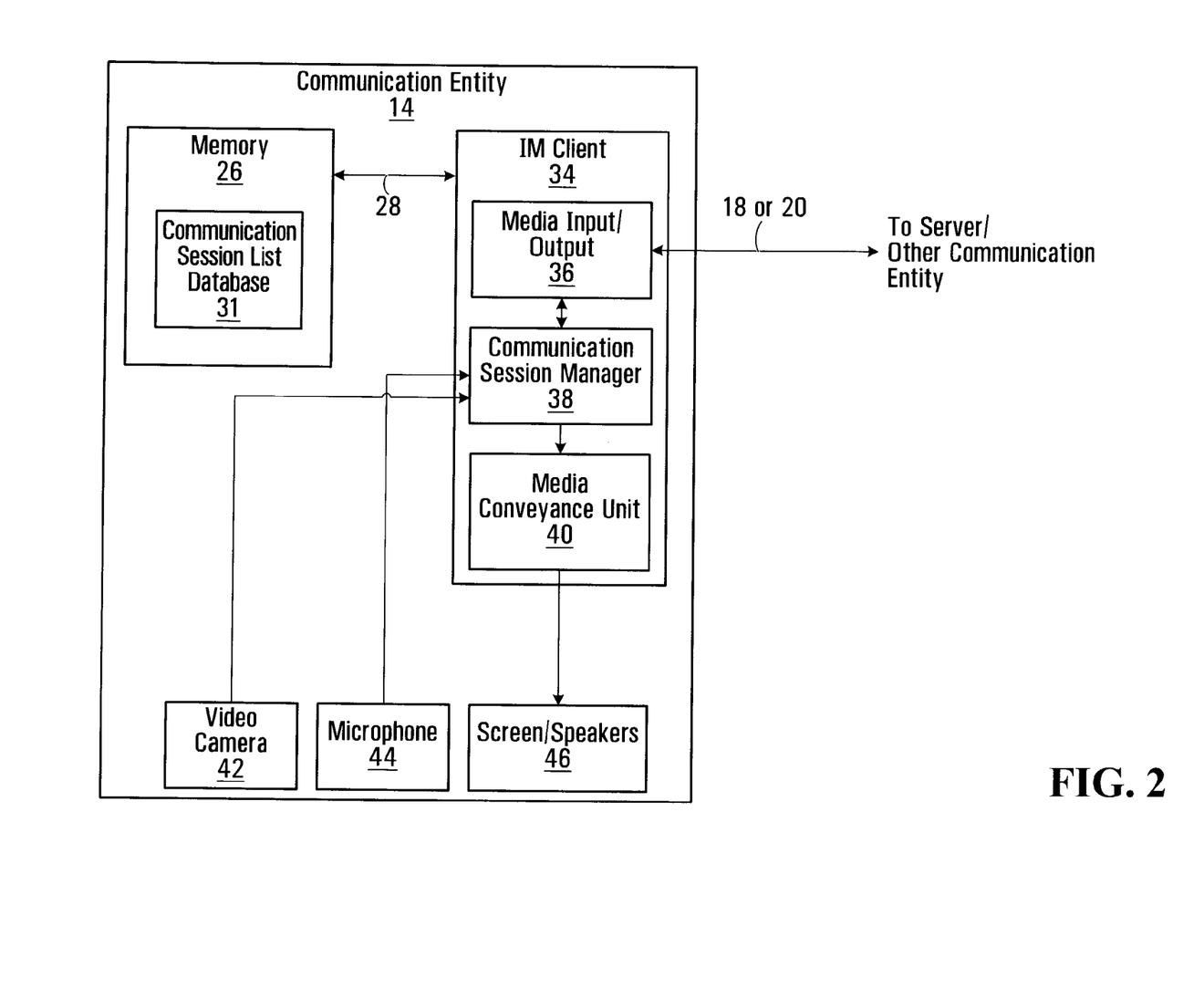
FIG. 2 shows a non-limiting block diagram of a communication entity, in accordance with an example of implementation of the present invention.

As used herein, the term "communication entity" refers to any device capable of connecting to the network 12, for transmitting and/or receiving media. For example, a communication entity can be a personal computer, a smartphone, a personal digital assistant or a cellphone, among other possibilities. Shown in FIG. 2 is a non-limiting functional block diagram of a communication entity 14 from the set of communication entities $14_{1-n}$. For the sake of simplicity, only one communication entity 14 will be described herein, but it should be appreciated that the components and functionality described with respect to the communication entity 14 shown in FIG. 2 will be substantially the same for each of the communication entities $14_{1-n}$.

For the purposes of the present description, each of the communication entities $14_{1-n}$, executes an instant messaging (IM) client 34 that is able to access an IM service, such as MSN messenger, GoogleTalk, iTalk, Yahoo Messenger, ICQ, MSN Communicator or Skype run on the server system of the network 12. As such, each of the communication entities $14_{1-n}$ is able to run an IM communication session for receiving and transmitting text, voice and/or video-conferencing media with other ones of the communication entities $14_{1-n}$ that are connected to the network 12. In accordance with the present invention, the voice and/or video conferencing media received for a given communication session at the communication entity 14 is handled in such a way that the communication session can continue even when a user of the communication entity 14 is distracted from that communication session for a period of time.

It should be appreciated that the communication entities $14_{1-n}$ are also able to run IM communication sessions with communication entities (not shown) that do not include IM capabilities. For example, a communication session can be run at the communication entity 14 with another communication entity that does not include an IM client. The other communication entity may be a telephone having voice-over-IP (VoIP), or voice-over IM (VoIM) capabilities. In the case where there is a gateway between a Public Switched Telephone Network (PSTN) and an IP network, the other communication entity can be a PSTN telephone. In the scenario where only the communication entity 14 includes an IM client 34, the two communication entities are able to exchange voice media, but the IM communication session occurs only from the perspective of the communication entity 14 that has the IM client 34.

As will be described in more detail below, each of the communication entities 14$_{1-n}$ handles media, such as voice and/or video-conferencing media, received for a communication session in such a way that the communication session can continue even when a user is distracted from that communication session for a period of time. When a user is distracted from a communication session, the communication session becomes inactive, such that incoming media associated with that communication session is not conveyed to a user, and is instead recorded for future use. When a user returns to that communication session, such that the communication session once again becomes active, the stored media is played back to a user. The stored media can be automatically played back when the communication session becomes active once again, or alternatively, the stored media can be played back to a user when the user provides an indication that the stored media should be played.

By playing the stored media back to a user when a previously inactive window becomes active once again, a user does not miss any of the voice conversation or video conferencing feed that was received for that communication session because they were temporarily pre-occupied. This handling of voice and/or video conferencing media allows multiple voice and/or video communication sessions to be conducted by a user of the communication entity 14 at the same time.

Communication Entity 14

As shown in FIG. 2, the IM client 34 at the communication entity 14 is in communication with a memory unit 26. The memory unit 26 includes a communication session list database 31 that will be described in more detail below. The instant messaging (IM) client 34 is operative for handling media sent to, and received from, other communication entities 14$_{1-n}$ in the context of conducting communication sessions. For the purposes of the present description, the term "communication session" generally refers to a session conducted at one of the communication entities 14$_{1-n}$ for receiving and transmitting text, voice and/or video media in substantially real-time with another communication entity connected via the server 16, or via a peer-to-peer connection 20, wherein the session can acquire an active state and an inactive state.

When the communication entity 14 is connected to the network 12, the IM client 34 is operative for obtaining presence information associated with selected other ones of the communication entities 14$_{1-n}$. The selected other ones of the communication entities 14$_{1-n}$ may be identified in a buddy list that is created by a user of the communication entity 14. The presence information is indicative of whether the communication entities in the buddy list are available for a communication session with the communication entity 14. This information can be presented to a user of the communication entity 14 via a display screen in a variety of different manners which are known in the art and will not be described in more detail herein. In accordance with a non-limiting example of implementation wherein the communication entity 14 provides the user with a windows-based interface, in order to establish a communication session with another communication entity, the user may simply double click on the name of a buddy whose presence information indicates that he/she is available for a communication session. This will launch a window associated with a communication session with that buddy, such that a communication session may begin. A user of the communication entity 14 may then terminate the communication session with that buddy, simply by closing the window associated with the communication session.

As shown in FIG. 2, the IM client 34 includes a media input/output 36, a communication session manager 38 and a media conveyance unit 40. The media input/output 36 is operative for receiving media from other communication entities and for transmitting media to other communication entities. Media input/output 36 transmits and receives media either via through the network server 16 or over a peer-to-peer connection 20. As described above, the peer-to-peer connection 20 may go through the network 12, but does not go through the server 16.

Figure 3:
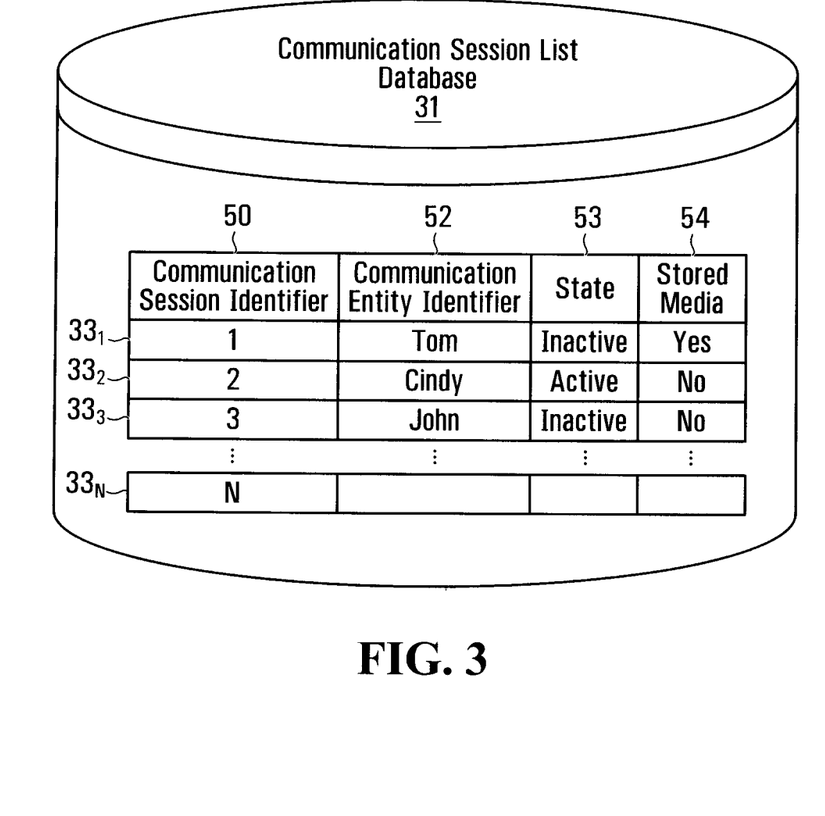
FIG. 3 shows a non-limiting example of a database listing ongoing communication sessions for a given communication entity, in accordance with an example of the present invention.

The communication session manager 38 is operative for establishing the communication sessions, as described above, and for handling the media associated with these communication sessions once they have been established. As shown in FIG. 2, the communication session manager 38 is in communication with a communication session list database 31, which lists all the communication sessions that are currently in progress at the communication entity 14 at any given time. A non-limiting example of the potential contents of the database 31 is shown in FIG. 3. As shown, the database 31 stores a plurality of entries 33$_1$ ... 33$_n$ each containing data elements associated with a respective ongoing communication session. In the non-limiting embodiment shown, each of the entries 33$_{1-n}$ includes a data element 50 identifying the communication session, a data element 52 identifying either the communication entity with whom the communication session is taking place, or the party associated with that communication entity, a data element 53 indicative of the active or inactive state of the communication session and a data element 54 indicative of whether there is stored media associated with the communication session. It should be appreciated that the database 31 may include additional data elements without departing from the spirit of the invention, such as a network identifier, the address of the communication entity in data element 52, etc . . . .

Although the database is shown in FIG. 2 as being part of the communication entity 14, it should be appreciated that a database containing the information described above could instead be maintained in the network 12, by the server 16, for example. In such an example, the IM client 34 would communicate with the network server 16 for storing information in the database and for obtaining information in the database. In yet a further alternative, the information contained in the database 31 shown in FIG. 3 could be spread out over multiple databases stored at different locations. For example, the list of communication sessions may be stored at the server 16, without an indication of the active or inactive state of each communication session. In such an embodiment, the operating system of the communication entity 14 would keep a record of the active and inactive states of the communication sessions. As such, in order to determine whether a communication session is active or inactive, the communication session manager 38 would query the operating system of the communication entity 14.

In addition, it should be appreciated that the communication session list database 31 may include any number of entries 33$_{1-n}$ depending on the number of communication sessions that are ongoing at the communication entity 14 at any given time. The number of entries contained in the communication session list database 31, as well as the data elements associated therewith, are dynamic. As a new communication session is started at the communication entity 14 a new entry will be added to the database 31. Likewise, when a communication session at the communication entity 14 ends, an existing entry will be removed from the database.

As mentioned above, each communication session is capable of acquiring an active state and an inactive state. As used herein, the term "active state" refers to a communication session in which the user is actively involved. In other words, the user is attentive to media being received for that communication session. In contrast, the term "inactive" refers to a communication session in which the user is not actively involved in communicating with the party associated with that communication session. When a communication session is inactive, a user is not attentive to media being received for that communication session. For example, a communication session may be inactive when a user is focused on another communication session, or on another program operating on the communication entity (such as Microsoft Word, Internet Explorer, etc . . . ).

Figure 4A:
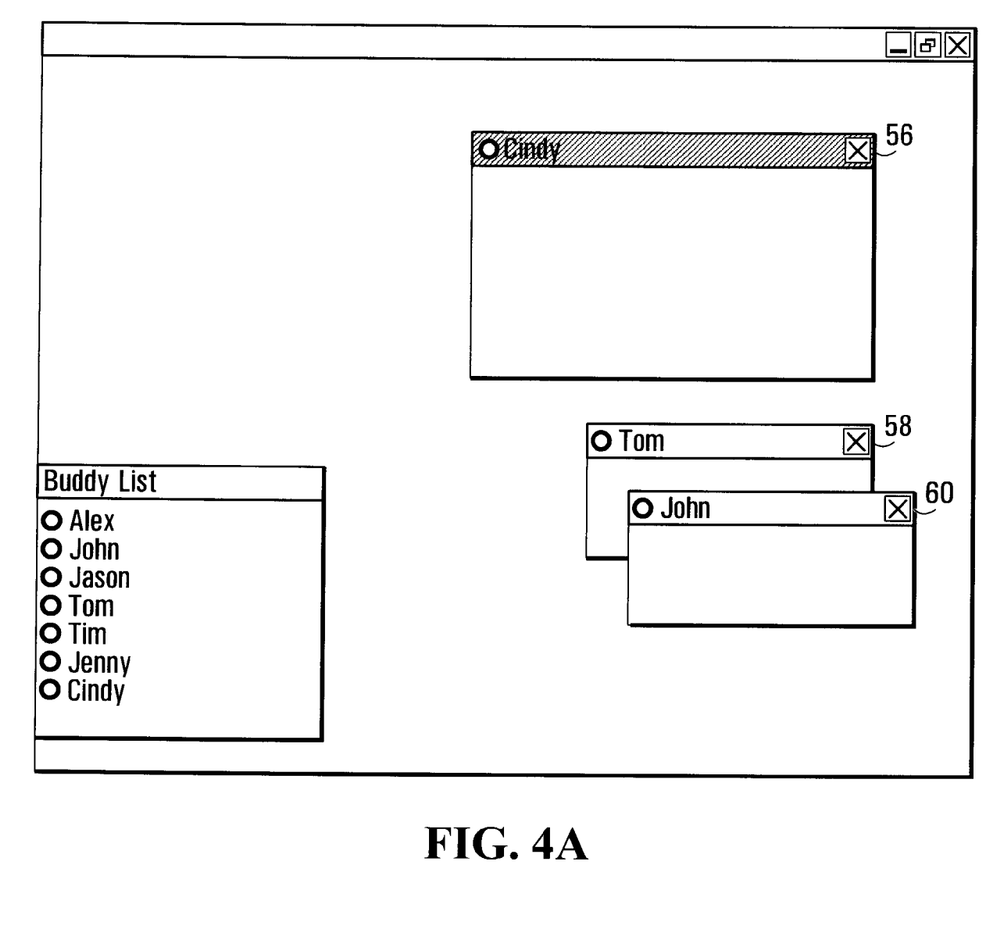
FIG. 4A shows a first non-limiting example of a display screen at a communication entity, in accordance with an example of implementation of the present invention.

There are a variety of ways for the communication session manager 38 to determine whether a communication session is active or inactive. In accordance with a non-limiting example of implementation in which the communication entity 14 provides the user with a window-based environment, each communication session (as well as other programs running at the communication entity 14) is associated with an individual window. As such, when a user is not focused on a given window, the communication session associated with that window is considered to be inactive. Shown in FIG. 4A is a non-limiting example of a display screen in which the user of the communication entity is in the process of conducting three voice communication sessions with three separate parties, namely Cindy, Tom and John. In the example shown, the window 56 associated with the communication session with Cindy is highlighted, and as such is the window that is currently selected by the user. As such, the communication session with Cindy is the active communication session. Meanwhile, the windows 58, 60 associated with the communication sessions with Tom and John are not currently selected by a user, and as such, are considered to be inactive. By switching back and forth between the three windows, the user is able to switch which communication session is active. It should be appreciated that no more than one communication session can be active at a time. As such, while a selected communication session is active, the remaining sessions are inactive.

Figure 4B:
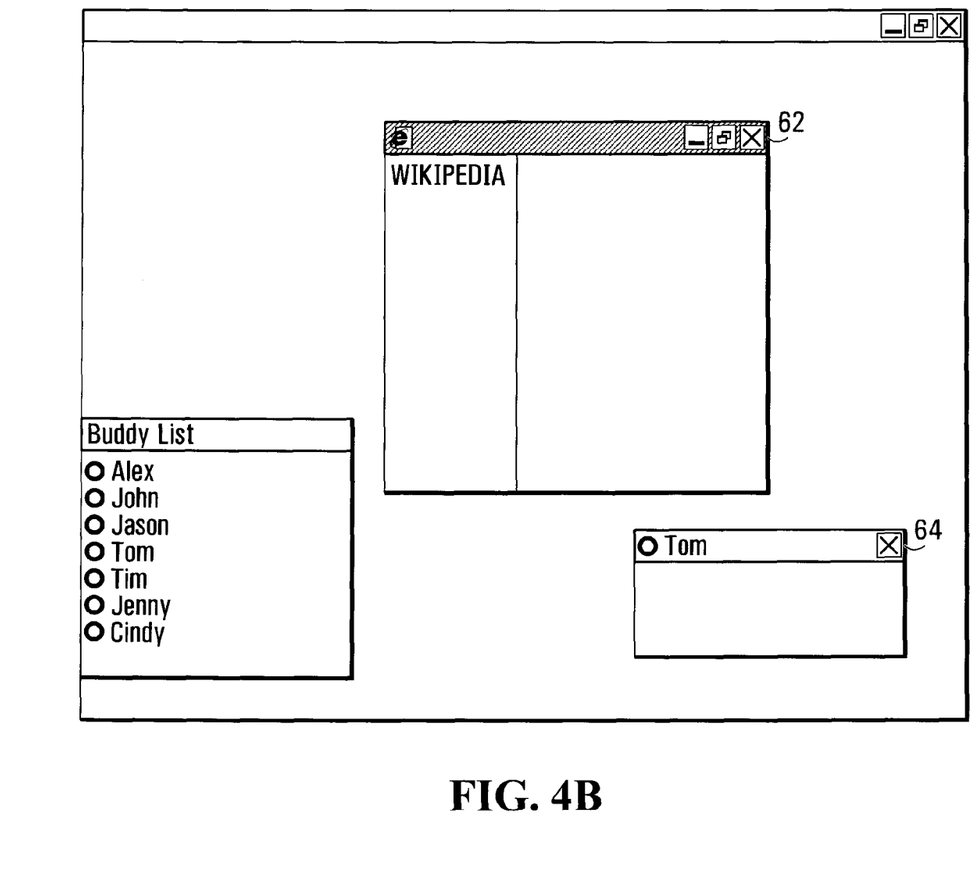
FIG. 4B shows a second non-limiting example of a display screen at a communication entity, in accordance with an example of implementation of the present invention.

A communication session can also become inactive when a user is focused on another type of program application operating at the communication entity. Shown in FIG. 4B is a non-limiting example of a display screen in which a user of the communication entity is in the process of conducting a communication session with Tom, and is also in the process of browsing the internet. As shown, the user has the window 62 associated with the internet browsing application selected, such that the window 64 associated with the communication session with Tom is temporarily inactive. Even when a user is only conducting a single communication session, that communication session can still become inactive when the user focuses their attention on something other than the window associated with that communication session.

In one non-limiting embodiment of the present invention, the communication session manager 38 is in communication with the operating system of the communication entity 14 for establishing whether a communication session that is in progress at the communication entity 14 is active or inactive. The operating system may inform the communication session manager 38 when a window is selected by a user (i.e. highlighted), such that the communication session manager 38 can determine that the communication session associated with that window is active. For example, an event is sent to the IM client 34 by the operating system, or windows management system, indicating that the application window has the focus (i.e. is active or not). Whenever a communication session switches from an active state to an inactive state, or vice versa, the communication session manager 28 records this change in the communication session list database 31. In this manner, the database 31 is kept up-to-date as to which communication session is active, and which ones are currently inactive.

Detecting when a communication session window is selected or not selected is one way for the communication session manager 38 to detect when a communication session is active or inactive. It should however be appreciated that other manners of determining the status of a communication session are also included within the scope of the present invention. For example, the communication session manager 38 may determine that a voice communication session is inactive when a user of the communication entity at which the communication session is operating has not spoken for a certain amount of time, or there has been no mouse or keyboard activity for a certain amount of time. This may signify that a user has left the communication entity, such as to go to the bathroom, but still has the window selected. In the case of video communication, the communication session manager 38 may determine that a user has left the computer (thus rendering the communication session inactive) if there is no activity or face detected on the web-cam.

Alternatively, whether a communication session is active or not can be detected on the basis of presence information. If the user has provided presence information or if the network has detected presence information, such as "away" or "out to lunch" then the communication session manager 38 may determine that a communication session is inactive. In yet another alternative, in the case where the communication entity is in the process of conducting a telephone session, then the communication session manager 38 may also determine that IM communication sessions are inactive. In the case where the communication entity is a cell-phone or a pda that requires that a user move a button or switch in order to toggle between communication sessions, the activation of such a button or switch may provide an indication of a change in activity status.

In addition to handling media received from another communication entity, the communication session manager 38 is also operative for handling media entered by a user of the communication entity 14 that is destined to be sent to another communication entity. To this end, the communication session manager 38 can be in communication with a keyboard (not shown), a video camera 42 and a microphone 44, for receiving media to send to another communication entity 14. Although the microphone 44 and video camera 42 are shown in FIG. 2 to be a part of the communication entity 14, it should be appreciated that these components may be external to the communication entity 14 and connected to the communication entity 14 via cables or a wireless link, without departing from the spirit of the invention.

Finally, the media conveyance unit 40 is operative for actually conveying media associated with an active communication session to a user of the communication entity 14. A more detailed explanation of the manner in which the IM client 34 operates in order to handle media associated with one or more communication sessions, will now be described in more detail with respect to the flow charts of FIGS. 5 and 6.

Process for Incoming Media

Figure 5:
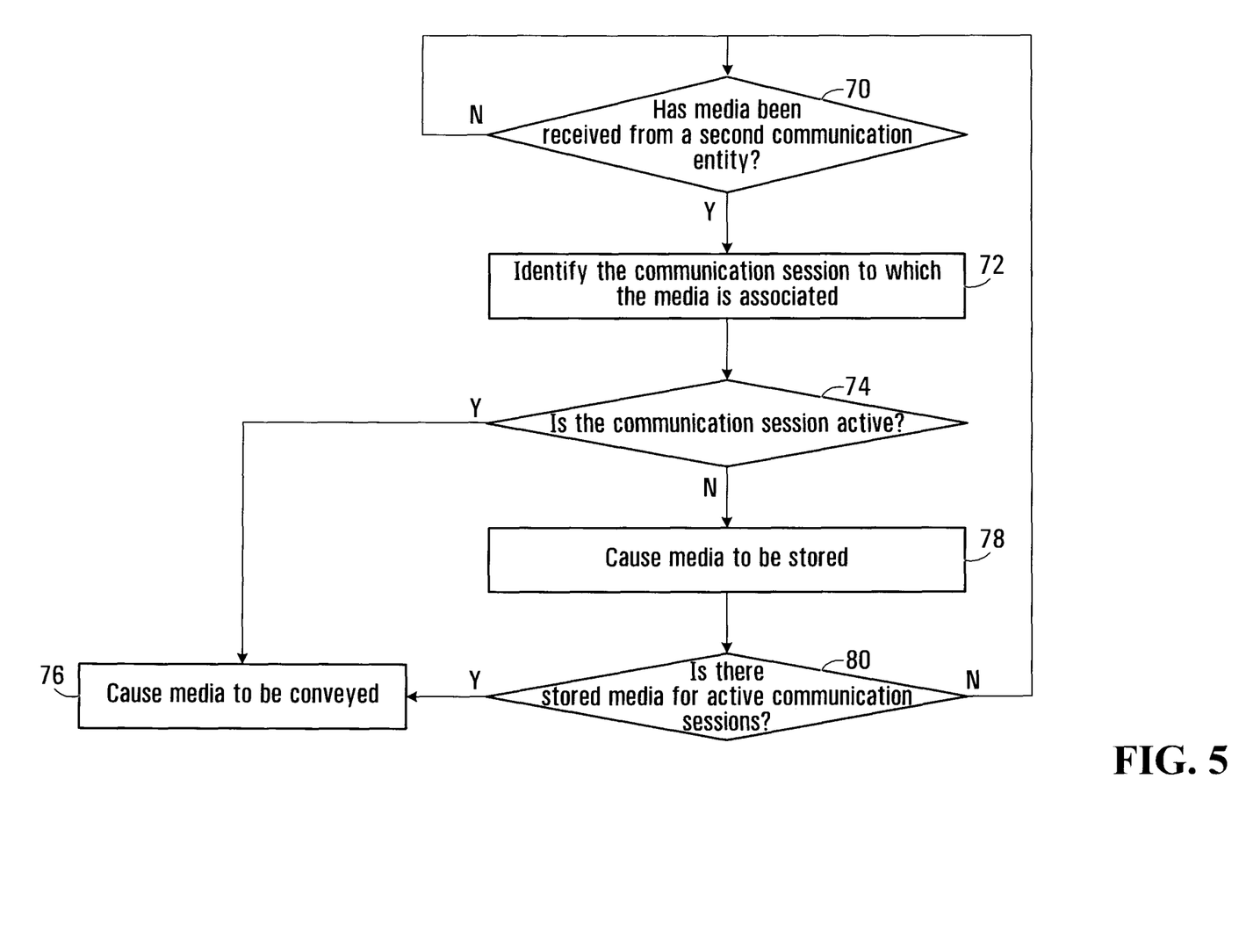
FIG. 5 shows a flow diagram of a process for handling media associated with a communication session, in accordance with a non-limiting example of implementation of the present invention.
Figure 6:
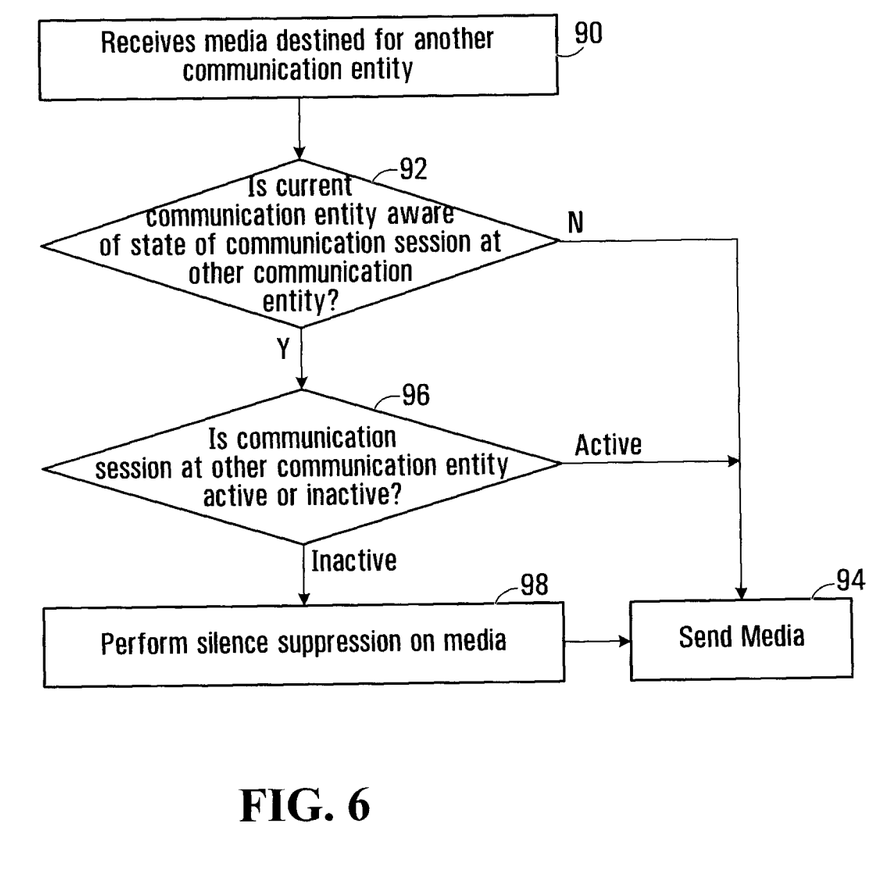
FIG. 6 shows a flow diagram of a process for transmitting media to a communication session at another communication entity, in accordance with a non-limiting example of implementation of the present invention.

Shown in FIG. 5 is a flow chart outlining a method performed by the IM client 34, and more specifically by the communication session manager 38, in order to manage incoming media associated with one or more communication sessions that are in progress at the communication entity 14. It should be appreciated that this is only one example of implementation, and that an alternative method for achieving substantially the same result could be implemented at the server 16, as will be described in more detail further on in the present application.

It should also be appreciated that this method assumes that media is only received for ongoing communication sessions. A call is considered ongoing, as soon as they have initiated a communication session with another communication entity, or in the case where the other communication entity has initiated the communication session, once the user has accepted commencement of the communication session. Acceptance of a communication session that is initiated via another communication entity may simply be done by clicking on an accept button, upon presentation of a window indicating that another communication entity would like to initiate a communication session.

Alternatively, media may be received from another communication entity in connection with a communication session that is not yet in existence. Upon receipt of such media, a new communication session is created at the communication entity 14, and this communication session is considered in an inactive state.

As described above, media received from other communication entities is received at the media input/output 36. The received media, whether text, voice and/or video media is then passed to the communication session manager 38. At step 70, the communication session manager 38 determines whether media has been received from another communication entity. In the case where received media is passed from the media input/output 36 to the communication session manager 38, the communication session manager 38 determines that media has been received, and proceeds to step 72. Whereas, if no media is received, the communication session manager 38 simply continues to wait for receipt of media from the media input/output 36.

At step 72, the communication session manager 38 identifies the communication session to which the received media is associated. In the case where more than one communication session is ongoing at the same time, such as in the example shown in FIG. 4A wherein the user of the communication entity 14 is in the process of conducting three different communication sessions, media can be received at any time for any one of the ongoing communication systems. As such, in order for received media to be linked to the appropriate communication session, the media includes an identifier associated therewith. The identifier can be indicative of the communication session to which that media is associated, or the identifier can be indicative of the sender of the media. By verifying the identifier against the information contained in each entry 33 of the communication session list database 31, the communication session manager 38 is able to determine the communication session to which the media is associated. For example, if the received media includes an identifier indicating that it was sent by Cindy (the identifier may be a unique network identifier, a serial number associated with Cindy's communication entity, or just the name or alias of the party) the communication session manager 38 is able to determine that that media is associated with the communication session with Cindy (identified as communication session #2 in FIG. 3).

At step 74, once the communication session manager 38 has identified the communication session to which the received media is associated, the communication session manager 38 then determines whether that communication session is active. This can be done by consulting the database 31. As mentioned above, and as shown in FIG. 3, each of the entries $33_{1-n}$ in the database 31 includes a data element 53 indicative of whether the communication session associated with the corresponding entry is active or inactive. The data element 53 may be a text indication, such as "active" or "inactive", as represented in FIG. 3, or the data element 53 may simply be a binary code, such as "10" for an active communication session, and "11" for an inactive communication session. Other manners of labelling a communication session as active or inactive can also be used without departing from the spirit of the invention.

In an alternative example, instead of checking the status of the communication session in the database 31, the status of each communication session could be continually checked in real-time.

At step 74, the communication session manager 38 is able to process the information contained in the database 31, and specifically data element 53, in order to determine whether the communication session to which the received media is associated is active or inactive.

In the case where the communication session for which media has been received is active, the communication session manager 38 proceeds to step 76, wherein it causes the received media to be conveyed to a user of the communication entity 14. This is done by passing the received media to the media conveyance unit 40 (shown in FIG. 2), which in turn passes the media to the appropriate speakers and/or display screen 46. In this manner, the media is displayed and/or broadcast to the user of the communication entity 14.

If the communication session is inactive, the communication session manager 38 proceeds to step 78, wherein it causes the received media to be stored. In accordance with a non-limiting example of implementation, the media is stored in the memory 26, such that, as will be described below, it can be accessed at a later time by the communication session manager 38. When the media is stored in the memory 26, the data element 54 in entry 33$_1$ indicates that media has been stored in connection with the communication session. For the sake of example, and referring to FIGS. 3 and 4a, in the case where the received media is associated with the communication session with Tom, which is an inactive communication session, the communication session manager 38 causes the media to be stored and causes data element 54 to indicate that media is stored. It should be appreciated that the data element 54 may be a text indication, such as "yes" or "no", or the data element 53 may simply be a binary code, such as "0" for no stored media, and "1" for stored media. In an alternative embodiment, the media can be stored at the server 16, and then accessed by the IM client when required.

By storing media associated with an inactive communication session, the communication session manager 38 ensures that a user of the communication entity 14 does not miss a portion of a voice and/or video conversation when the user is focussed on a different communication session, or on another type of computer related task.

In accordance with a non-limiting embodiment, when the communication session manager 38 receives media associated with an inactive communication session, it can advise the user when media for that inactive communication session is being received, and/or when stored media for that inactive communication session is available. Take for example the situation shown in FIG. 4A, wherein the user is in the progress of having three separate voice conversations; namely with Cindy, Tom and John. The voice conversation with Cindy is the communication session that is currently active, but media may still be received from both Tom and John. As such, in the case where media is being received from Tom while the communication session with Cindy is active, the user may receive a text message in a separate window saying "message being received from Tom". Alternatively, the user may be presented with an icon in the window associated with Tom, such as an opening letter, or an incoming arrow, which would advise the user that media is being received from Tom. Alternatively, the window associated with Tom may change colour when media from Tom is being received. It should be appreciated that any manner of alerting the user to the fact that media is being received is included within the scope of the present invention. For example, a user may be provided with an indication in an active window that media is currently being received in connection with a communication session in a non-active window.

In addition, the communication session manager 38 can advise the user of the communication entity 14 when stored media is available. Keeping with the above example, when media from Tom has been fully received, and is stored in the memory 26 of the communication entity 14, the communication session manager 38 can advise the user of the communication entity 14 that stored media from Tom is available. Again, this can be done by providing the user with a text message in a separate window, or in the window associated with Tom, stating that "stored media is available". Alternatively, an icon representing stored media can be provided in the window associated with Tom. In still another alternative, the window associated with Tom may change colour when stored media is available. In the case where colour is used to advise the user when media is being received and when stored media is available, an inactive window may be green when there is no media associated with that window. Then the window may turn orange as media is being received, and finally turn red once the received media has been stored and is available for playback. It should be appreciated that any manner of alerting the user to the fact that media has been stored is included within the scope of the present invention. For example, a user may be provided with an indication in an active window that there is stored media available in connection with a communication session in a non-active window.

In accordance with an optional embodiment, in the case where voice media is received for an inactive communication session, the communication session manager 38 further determines whether the received media has had a silence suppression operation performed on it. In one non-limiting example, in the case where the sending communication entity has performed silence suppression on the media prior to transmission, a data bit is included in the header information such that the receiving communication entity knows that a silence suppression operation has been performed on the media. Alternatively, the communication entity 14 can process the media according to known processing methods in order to determine whether a silence suppression operation has been performed on it. In the case where no silence suppression has been performed on the voice media, the communication session manager 38 then proceeds to perform a silence suppression operation on the media prior to storing it in the memory 26. In this manner, breaks, or pauses in the voice media are removed, such that useless silences are not played back to a user of the communication entity 14 when the stored media is played back.

In the case where the communication entity 14 is connected to another communication entity over the network 12, each of the communication entities can be provided with presence information associated with the other communication entity. As described previously, the presence information for each communication entity is provided to the IM client 34 by the network server 16. In addition, in certain cases, the network server 16 may also provide the IM client of each communication entity with information about the state of the communication session at the other communication entity. As such, in the case where the communication entity 14 (shown in FIG. 2) is involved in a communication session with another communication entity, that other communication entity may be aware when its associated communication session at the communication entity 14 is in an active state and an inactive state. This information may be provided to the user of the other communication entity via a visual representation on a user interface of the communication entity. In alternative embodiments, the other communication entity may become aware of this information without conveying it to the user. In the case where the other communication entity knows that its associated communication session at the communication entity 14 is in an inactive state, then it may optionally perform silence suppression on media that it sends to the communication entity 14 prior to sending it, given that this media will simply be stored upon receipt at the communication entity 14. By performing silence suppression on the transmitted media, less bandwidth is required to transmit the media.

However, in the case where the other communication entity is not aware when its associated communication session at the communication entity 14 is in an active state or an inactive state, then the media sent over the network 12 (or over a peer-to-peer connection 20) is not silence suppressed. For example, in the case where the communication entity 14 is in the process of conducting a communication session with a communication entity that does not have an IM client but instead simply communicates with the communication entity 14 via a VoIP connection, then the communication entity that does not run an IM client will not silence suppress voice media that is sent to the communication entity 14.

Although not specifically illustrated in the flow chart, it should be appreciated that throughout the course of operation, the IM client 34, and specifically the communication session manager 38, monitors the communication sessions in progress at the communication entity 14 to determine when there is a change in the active/inactive state of a communication session.

At step 80, the communication session manager 38 determines whether there is an active communication session, and whether there is stored media associated with the active communication session. This can be checked by continuously polling the entries $33_{1-n}$ in the database 31, or alternatively, by simply periodically checking the data element 54 in the entry associated with the active communication session. Alternatively, the communication session manager 38 simply checks the data element 54 when a previously inactive communication system becomes active. Alternatively, in the case where an indication is not included within the database 31, the communication session manager 38 can determine whether there is stored media associated with an active communication session by checking directly with the operating system of the communication entity 14. This can be done by polling the operating system when new media is received for a communication session.

As mentioned above, when a previously inactive communication session becomes active, media that was stored for that communication session is played for the user of the communication entity 14. Therefore, upon detection at step 80 that there is stored media associated with an active communication session, the communication session manager 38 proceeds to step 76 which is to cause the stored media to be conveyed to the user of the communication entity 14. As described above, this is done by passing the received media to the media conveyance unit 40 (shown in FIG. 2), which in turn passes the media to the appropriate speakers and/or display screen 46. In this manner, the media is displayed and/or played back to the user of the communication entity 14.

In accordance with a first non-limiting embodiment, the stored media for a given communication session is played back to a user of the communication entity 14 automatically when the window associated with that communication session is re-activated. However, in an alternative non-limiting embodiment, in the case where there is stored media available for a given communication session, when a user of the communication entity re-activates the window associated with that communication session, the communication session manager 38 may prompt the user to cause the stored media to be played. For example, upon re-activation of a previously inactive window, the user may be provided with a prompt asking "would you like to play back a stored message?". In order to hear the stored message, the user may have to click on a "yes" button. In yet a further alternative, a user may not be prompted to play back the stored media, and instead is required to pro-actively provide an indication that media stored in connection with that window should be played. For example, the user may have to click on a "play media" button. Or the user may have to select the playback feature from a menu list. For example, the user would have to select MENU→FILE→Play Back.

After step 76, or in the case where at step 80 there is no stored media associated with the active communication session, the process cycles back to step 70 and starts again.

Process for Outgoing Media

As mentioned above, the communication session manager 38 of the communication entity 14 is also operative for handling media that is intended to be sent to another communication entity. A non-limiting example of a process used by the communication session manager 38 in order to handle outgoing media will now be described in further detail with respect to the flow chart shown in FIG. 6.

At step 90, the communication session manager 38 of the communication entity 14 receives media destined for another communication entity. As shown in FIG. 2, this media can be received from the microphone 44, the video camera 42, or in the case of a traditional instant messaging communication session, the keyboard (not shown). As mentioned above, the microphone 44 and video camera 42 may be an integral part of the communication entity 14 or they may be external to the communication entity 14 and connected via cables and/or a wireless link.

At step 92, the communication session manager 38 of the communication entity 14 determines whether it is aware of the state of the communication session at the other communication entity. In other words, is the communication session manager 38 of the communication entity 14 aware of whether its communication session with the other communication entity is in an active state or an inactive state at the other communication entity. As described above, the communication session manager 38 may receive presence information from the network server 16 indicative of whether the communication session between the communication entity 14 and the other communication entity is in an active state or an inactive state at the other communication entity. However, in other cases, the communication session manager 38 will not receive this information, and as such will not be aware of the active or inactive state of the communication session at the other communication entity.

In the case where the communication session manager 38 is not aware of the active or inactive state of the communication session between the communication entity 14 and the other communication entity at the other communication entity, the communication session manager 38 proceeds to step 94, which is to send the outgoing media to the other communication entity. This is done by passing the outgoing media to the media input/output 36 and sending this media over either communication link 18 or 20.

However, in the case where the communication session manager 38 is aware of the active or inactive state of the communication session between the communication entity 14 and the other communication entity at the other communication entity, the communication session manager 38 then proceeds to step 96, at which point it determines whether the communication session at the other communication entity is in the active or inactive state.

In the case where the communication session between the communication entity 14 and the other communication entity is in an active state at the other communication entity, the communication session manager 38 proceeds to step 94 wherein the outgoing media is sent to the other communication entity. More specifically, given that the communication session is in an active state at the other communication entity, communication between the two entities is happening in substantially real time. As such the communication session manager 38 at the communication entity 14 simply sends the outgoing media to the other communication entity 14 as soon as it is received from the microphone 44 and/or the video camera 42. As described above, the communication session manager 38 forwards the outgoing media to the media input/output 36, which in turn sends the media to the other communication entity over either communication link 18 or 20.

In the case where the communication session manager 38 at the communication entity 14 determines at step 96 that the communication session is in an inactive state at the other communication entity 14, meaning that the user of the other communication entity is distracted from the present communication session and is not actively waiting to hear from the user of the communication entity 14, then there is no need to send the outgoing media to the other communication entity 38 immediately. In addition, there is no need to send any silences contained in a voice media message to the other communication entity. As such, when the communication session is inactive at the other communication entity, the communication session manager 38 at the communication entity 14 proceeds to step 98, which is to perform silence suppression on the media intended to be sent to the other communication entity. Any method suitable for performing silence suppression can be used without departing from the spirit of the invention. In accordance with a non-limiting embodiment, a data element can be included in the header information of the media indicating that it has been silence suppressed.

Once the silence suppression operation has been performed on the outgoing media, the communication session manager 38 proceeds to step 94 wherein the silence suppressed media is sent to the other communication entity. More specifically, the silence suppressed media is forwarded to the media input/output 36, which in turn sends the media to the other communication entity over either communication link 18 or 20. Since the communication session with the communication entity 14 is inactive at the other communication entity, when a user at the other communication entity eventually returns to the communication session with the communication entity 14, the silence suppressed media has the advantage that it does not take as long to play back to the user of the other communication entity as it took the user of the communication entity 14 to record. In this manner, even though the user of the other communication entity was distracted for a period of time, it is possible for that user to "catch-up" with the communication session that was previously inactive. In some circumstances, the user of the communication entity 14 that sent the silence suppressed media, may not even realise that the communication session at the other communication entity was ever inactive.

The method described above with respect to FIG. 6 assumes that silence suppression is only performed on outgoing media when it is known that the communication session at the receiving communication entity is in an inactive state. It should, however, be appreciated that silence suppression could be performed on all media being sent between the two communication entities regardless of whether the communication session is active or inactive. In addition, silence suppression can be performed on outgoing media even if the sending communication entity is unaware of the status of the communication session at the receiving communication entity. This is similar to the manner voice media is transmitted in VoIP in order to conserve bandwidth.

In yet a further alternative, it is possible that no silence suppression is performed on outgoing media, regardless of the active or inactive state of the communication session at the receiving communication entity.

Although not shown in the drawings, it should be appreciated that the communication entity 14 may include a processing unit having suitable hardware, software or firmware for processing data and program instructions in order to execute the various functions of the IM client 34 described above. Those skilled in the art should appreciate that the program instructions may be written in a number of programming languages for use with many computer architectures or operating systems. For example, some embodiments may be implemented in a procedural programming language (e.g., "C") or an object oriented programming language (e.g., "C++" or "JAVA").

Process Performed at Server

It will be appreciated that the system for handling media as described above with respect to the IM client 34 may also be done by a server unit that is operative for implementing the methods as described above with respect to FIGS. 5 and 6. In order to perform the steps of conveying media to a user of a communication entity 14, the server unit may transmit a signal for causing the media to be conveyed via the speakers and/or screen 46 at the communication entity. FIG. 1 illustrates a network-based client-server system 10 wherein the server 16 can implement the above described methods for handling media sent between two communication entities 14 in the client-server system 10.

In such an embodiment, the server 16 can become aware of whether a given communication session is active or inactive at a communication entity by communicating with the operating system, or the IM client 34 at the communication entity 14. Alternatively, the server 16 can detect inactivity by analysing whether media content is going back and forth between two communication entities, or whether there is a long period of silence following media being received for a given communication session. In yet a further alternative embodiment, the server 16 may compare a given communication session to other communication sessions taking place at the communication entity. The server could then deduce which communication session is active on the basis of this comparison.

In order to implement the above-described methods, the server 16 includes a program element for execution by a CPU. The program element implements similar functionality to that described above with respect to the IM client 34, and includes the necessary networking functionality to allow the server 16 to communicate with the communication entities 141-*n* over network 12. In a non-limiting example of implementation, the program element includes a number of program element components, each program element component implementing a respective portion of the functionality of IM Client 34. Broadly stated, the program element includes 3 program element components:

1. The first program element component is for determining when a communication session associated with one of the communication entities is in an inactive state.
2. The second program element component is for causing media associated with the communication session to be stored upon determination that the communication session has entered an inactive state; and
3. The third program element component is for causing the stored media to be conveyed to a user of a communication entity upon determination that the communication session has re-entered an active state.

Although the present invention has been described in considerable detail with reference to certain preferred embodiments thereof, variations and refinements are possible without departing from the spirit of the invention. Therefore, the scope of the invention should be limited only by the appended claims and their equivalents.

The invention claimed is:

1. A method of handling media at a first communication entity, the media being associated with a communication session that is capable of entering an active state and an inactive state, said method comprising:
   a) receiving media associated with the communication session from a second communication entity;
   b) determining when the communication session has entered an inactive state;
   c) causing media associated with the communication session and received from the second communication entity to be stored in response to a determination that the communication session has entered an inactive state;
   d) determining when the communication session has re-entered an active state; and
   e) causing the stored media to be conveyed to a user of the first communication entity upon determination that the communication session has re-entered an active state.

2. A method as defined in claim 1, wherein said method is performed at the first communication entity.

3. A method as defined in claim 1, wherein said method is performed at a network server.

4. A method as defined in claim 1, further comprising upon determination that the communication session has re-entered an active state, prior to conveying the stored media, receiving from a user of the first communication entity a request that the stored media be conveyed.

5. A method as defined in claim 4, further comprising prompting a user to request that the stored media be conveyed.

6. A method as defined in claim 1, wherein when a user of the first communication entity is attentive to communication with the second communication entity, the communication session with the second communication entity is in an active state.

7. A method as defined in claim 6, wherein a user of the first communication entity is attentive to communication with the second communication entity when a window associated with a communication session with the second communication entity is selected.

8. A method as defined in claim 1, further comprising causing the second communication entity to be aware of whether the communication session at the first communication entity is in an active or inactive state.

9. A method as defined in claim 1, further comprising, when the communication session is in the inactive state, providing an indication to a user of the first communication entity when media is being received from the second communication entity.

10. A method as defined in claim 9, wherein the indication that media is being received is a visual indication.

11. A method as defined in claim 1, further comprising, when the communication session is in the inactive state, providing an indication to a user of the first communication entity when stored media associated with the communication session is available.

12. A method as defined in claim 11, wherein the indication that stored media is available is a visual indication.

13. A method as defined in claim 1, wherein the communication session is an IM session.

14. A method as defined in claim 13, wherein the IM session provides an IM window, such that the active state and inactive state of the communication session are indicative of an operational state of the IM window.

15. A method as defined in claim 1, further comprising causing silence suppression to be performed on the media that is being stored.

16. A method as defined in claim 15, wherein the silence suppression is performed on the media at the second communication entity.

17. A method as defined in claim 1, wherein the media includes voice data.

18. A method as defined in claim 1, wherein the media includes video data.

19. A communication device comprising:
a) an input for receiving from a second communication device media associated with a communication session, the communication session being capable of entering an active state and an inactive state;
b) a hardware processing unit for:
 i) determining when the communication session has entered an inactive state;
 ii) causing media associated with the communication session and received from the second communication entity to be stored in response to a determination that the communication session has entered an inactive state;
 iii) determining when the communication session has re-entered an active state; and
 iv) causing the stored media to be conveyed to a user of the communication device upon determination that the communication session has re-entered an active state.

20. A communication device as defined in claim 19, wherein when a user of the communication device is attentive to communication from the second communication device, the communication session associated with the second communication device is in an active state.

21. A communication device as defined in claim 20, wherein a user of the first communication device is attentive to communication with the second communication device when a window associated with a communication session with the second communication device is selected.

22. A communication device as defined in claim 19, wherein upon determination that the communication session has re-entered an active state, prior to conveying the stored media, the processing unit being operative for receiving a request from a user of the communication device that the stored media be conveyed.

23. A communication device as defined in claim 22, wherein the processing unit is operative for prompting a user to request that the stored media be conveyed.

24. A communication device as defined in claim 19, wherein said communication device is one of a personal computer, a personal digital assistant, a smartphone and a cellular telephone.

25. A communication device as defined in claim 19, wherein said communication device and said second communication device are in communication with one another via a network server.

26. A communication device as defined in claim 19, wherein said communication device and said second communication device are in communication with one another via a peer-to-peer connection.

27. A communication device as defined in claim 19, further comprising an output for releasing a signal indicative of whether the communication session is in an active state or an inactive state.

28. A communication device as defined in claim 27, further comprising when the communication session is in an inactive state, said processing unit causes an indication to be provided to a user of said communication device when media is being received from the second communication device.

29. A communication device as defined in claim 28, further comprising a user interface for conveying to a user of said communication device the indication that media is being received from the second communication device.

30. A communication device as defined in claim 27, further comprising when the communication session is in an inactive state, said processing unit causes an indication to be provided to a user of said communication device when stored media is available.

31. A communication device as defined in claim 19, wherein the communication session is an IM session.

32. A communication device as defined in claim 31, wherein the MI session includes an IM window, such that the active state and inactive state of the communication session are indicative of an operational state of the IM window.

33. A communication device as defined in claim 19, wherein said processing unit is operative for causing silence suppression to be performed on the media that is being stored.

34. A communication device as defined in claim 33, wherein said processing unit provides an indication to the second communication device of the active or inactive state of the communication session.

35. A communication device as defined in claim 34, wherein the second communication device is operative for performing silence suppression on media to be sent to said communication device, upon receipt of a signal from said communication device indicative that the communication session is in an inactive state.

36. A communication device as defined in claim 19, wherein the media includes voice data.

37. A communication device as defined in claim 19, wherein the media includes video data.

38. A communication device comprising:
a) a first hardware functional unit for receiving media from a second communication device, the media being associated with a given communication session occurring at said first communication device;

b) a second functional unit for:
 i) monitoring at least one communication session occurring at said first communication device;
 ii) identifying a given communication session in the at least one communication session to which the media received from the second communication device is associated;
 iii) determining whether the given communication session has entered an inactive state;
 iv) in response to a determination that the given communication session has entered the inactive state, causing the media associated to the given communication session and received from the second communication device to be stored;
 v) determining whether the given communication session has re-entered an active state;

c) a third functional unit for causing the stored media to be conveyed to a user of said first communication device in response to detection by the second functional unit that the given communication session has re-entered an active state.

39. A communication device as defined in claim 38, wherein upon detection by the second functional unit that the given communication session has re-entered an active state, prior to conveying the stored media, the third functional unit being operative for receiving a request from a user of the communication device that the stored media be conveyed.

40. A communication device as defined in claim 39, wherein the third functional unit is operative for prompting a user to request that the stored media be conveyed.

41. A communication device as defined in claim 38, wherein said first functional unit is operative for receiving media from a plurality of other communication devices, the media from each of the plurality of other communication devices being associated with a respective different communication session at said communication device.

42. A communication device as defined in claim 41, wherein said communication device is in communication with said plurality of other communication devices via a network server.

43. A communication device as defined in claim 41, wherein said second functional unit is operative for monitoring a plurality of communication sessions occurring at said communication device, wherein only one of said plurality of communication sessions is in an active state.

44. A communication device as defined in claim 41, wherein all of said plurality of communication sessions are in an inactive state.

45. A communication device as defined in claim 38, wherein said communication device is one of a personal computer, a personal digital assistant, a smartphone and a cellular telephone.

46. A communication device as defined in claim 38, Wherein when the given communication session is in an inactive state, said second functional unit causing an indication to be provided to a user of said communication device when media associated with the given communication session is being received.

47. A communication device as defined in claim 46, further comprising a user interface for conveying to a user of said communication device the indication that media associated with the given communication session is being received.

48. A communication device as defined in claim 38, Wherein when the given communication session is in an inactive state, said second functional unit being operative for providing to a user of said communication device an indication that stored media associated with the given communication session is available.

49. A communication device as defined in claim 38, wherein each of the at least one communication sessions is an IM session.

50. A communication device as defined in claim 49, wherein the IM sessions include an IM window, such that the active state and inactive state of the communication session are indicative of an operational state of the IM window.

51. A communication device as defined in claim 38, wherein said second functional unit is operative for causing silence suppression to be performed on the media that is being stored.

52. A communication device as defined in claim 38, wherein the media includes voice data.

53. A communication device as defined in claim 38, wherein the media includes video data.

54. A non-transitory computer-readable memory storing instructions which, when executed by a hardware processing unit of a first communication entity, cause the processing unit to execute a process for handling media associated with a communication session that is capable of entering an active state and an inactive state, the process comprising:
 a) receiving media associated with the communication session from a second communication entity;
 b) determining when the communication session has entered an inactive state;
 c) causing media associated with the communication session and received from the second communication entity to be stored in response to a determination that the communication session has entered an inactive state;
 d) determining when the communication session has re-entered an active state; and
 e) causing the stored media to be conveyed to a user of the first communication entity upon determination that the communication session has re-entered an active state.

55. A non-transitory computer readable memory as defined in claim 54, wherein said processing unit is located at the first communication entity.

56. A non-transitory computer readable memory as defined in claim 54, wherein said processing unit is located at a network server.

57. A non-transitory computer readable memory as defined in claim 54, Wherein upon determination that the communication session has re-entered an active state, the processing unit is operative for receiving a request from a user of the first communication entity that the stored media be conveyed prior to conveying the stored media.

58. A non-transitory computer readable memory as defined in claim 57, wherein the processing unit is operative for prompting a user to request that the stored media be conveyed.

59. A server system for handling media at a first communication entity, the media being associated with a communication session that is capable of entering an active state and an inactive state, said server system storing a program element on a non-transitory computer readable medium for execution by a hardware processing unit, said program element comprising:
 a) a first program element component for receiving media associated with the communication session from a second communication entity and determining when the communication session has entered an inactive state;
 b) a second program element component for causing media associated with the communication session and received from the second communication entity to be stored in response to a determination that the communication session has entered an inactive state; and;

c) a third program element component for determining when the communication session has re-entered an active state and causing the stored media to be conveyed to a user of the first communication entity upon determination that the communication session has re-entered an active state.

60. A system comprising:
a) a first communication device; and
b) a second communication device, comprising:
  i) an input for receiving from the first communication device media associated with a communication session, the communication session being capable of entering an active state and an inactive state, wherein when the communication session is in the active state a user of said second communication device being attentive to communication with said first communication device;
  a hardware processing unit for:
    (1) determining when the communication session has entered an inactive state;
    (2) causing the media associated with the communication session and received from the second communication entity to be stored in response to a determination that the communication session has entered an inactive state;
    (3) determining when the communication session has re-entered an active state; and
    (4) causing the stored media to be conveyed to a user of the second communication device upon determination that the communication session has re-entered an active state.

61. A system as defined in claim 60, wherein upon determination that the communication session has re-entered an active state, prior to conveying the stored media the processing unit being operative for receiving a request from a user of the second communication device that the stored media be conveyed.

62. A system as defined in claim 61, wherein the processing unit is operative for prompting a user to request that the stored media be conveyed.

63. A system as defined in claim 60, wherein said second communication device is in communication with said first communication device over a network.

64. A system as defined in claim 60, wherein said second communication device is in communication with said first communication device over a peer-to-peer connection.

65. A system as defined in claim 60, wherein said first communication device and said second communication device are one of a personal computer, a personal digital assistant, a smartphone and a cellular telephone.

66. A system as defined in claim 60, wherein when said communication session is in an inactive state, said processing unit being operative for causing an indication to be provided to a user of said second communication device when media is being received from said first communication device.

67. A system as defined in claim 66, wherein said second communication device further comprises a user interface for conveying to a user of said second communication device the indication that media from said first communication device is being received.

68. A system as defined in claim 60, wherein when the communication session is in an inactive state, said processing unit being operative for providing to a user of said second communication device an indication that stored media associated from the first communication device is available.

69. A system as defined in claim 60, wherein the communication session is an IM session.

70. A system as defined in claim 69, wherein the IM session include an IM window, such that the active state and inactive state of the communication session are indicative of an operational state of the IM window.

71. A system as defined in claim 60, wherein said processing unit is operative for causing silence suppression to be performed on the media that is being stored.

72. A system as defined in claim 60, wherein said processing unit provides an indication to said first communication device of the active or inactive state of the communication session.

73. A system as defined in claim 60, wherein said first communication device is operative for performing silence suppression on media to be sent to said second communication device, upon receipt of a signal from said second communication device indicative that the communication session at the second communication device is in an inactive state.

74. A system as defined in claim 60, wherein the media includes voice data.

75. A system as defined in claim 60, wherein the media includes video data.

* * * * *